G. STEVENS & J. H. WATSON.
Plastering-Machines.

No. 145,459.             Patented Dec. 9, 1873.

Witnesses:

Inventor:

UNITED STATES PATENT OFFICE.

GUSTAVUS STEVENS AND JAMES H. WATSON, OF TAWAS CITY, MICHIGAN.

IMPROVEMENT IN PLASTERING-MACHINES.

Specification forming part of Letters Patent No. 145,459, dated December 9, 1873; application filed August 13, 1873.

*To all whom it may concern:*

Be it known that we, GUSTAVUS STEVENS and JAMES H. WATSON, of Tawas city, in the county of Iosco and State of Michigan, have invented a new and Improved Plastering-Machine; and we do hereby declare the following to be a full, clear, and exact description of the same, reference being had to the accompanying drawing forming part of this specification, in which—

Figure 1:
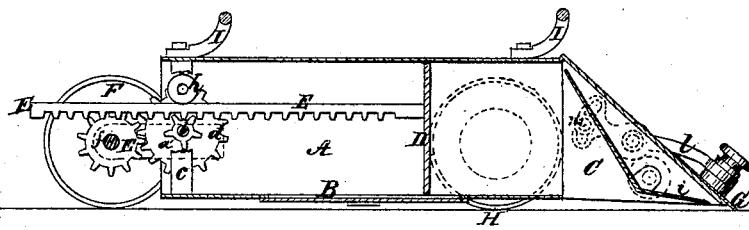
Figure 3:
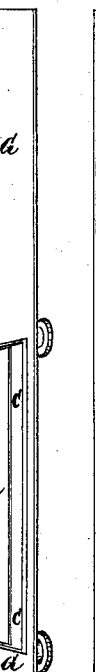
Figure 2:
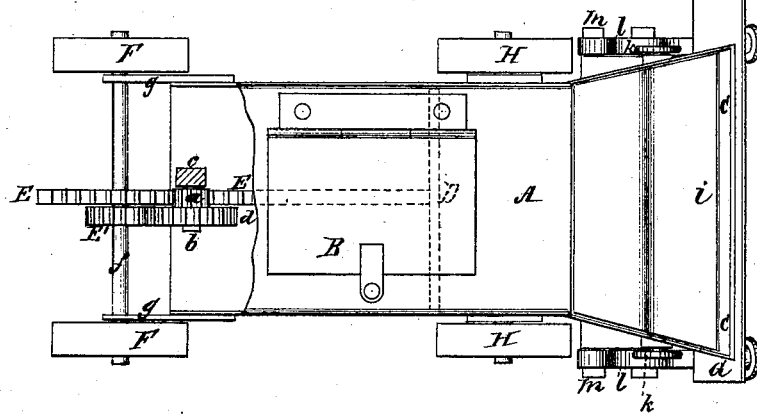

Figure 1 is a longitudinal vertical section; Fig. 2, bottom view, partly broken out; Fig. 3, edge view of outer trowel.

Our invention is a machine for plastering the walls of buildings, and is so constructed as to lay on and spread the mortar in one operation.

The box A, which may be made of light metal, or other suitable material, is intended to hold the mortar, which is introduced through the door B on the under side. On one end of this box is a trough-shaped mouth, C, open on the under side. Fitted to move backward and forward within the box is a plate or plunger, D, attached to one end of a rack-bar, E, the teeth of which mesh into a pinion, $a$, that is attached to a cog-wheel, $d$, and these are fitted to revolve upon a stud, $b$, that projects from a standard, $c$. E' is a cog-wheel, secured upon a shaft, $f$, which is journaled in arms $g$ $g$, projecting from the end of the box, and has secured upon its outer ends the wheels F F. A roller, $h$, attached to the upright $c$, serves to keep the rack-bar in gear. The mouth C of the box is provided with an inner trowel, $i$, which can be adjusted, by means of the thumb-nuts $k$, to vary the size of the opening. The mouth also has an outer trowel, G, attached to one end of lever-arms $l$, which are pivoted to the sides of the mouth and made adjustable by slots and screws $m$ at the other end. This trowel is much longer than the width of the box, so as to smooth the plaster after the truck-wheels have passed over it. The trowel can be removed and the projecting part changed to one side or the other. The rear of the box, like the front, is mounted upon truck-wheels H H. The box is held and manipulated by means of the handles I I.

The operation of the machine is as follows: The rack-bar E is first drawn out, and the box then filled with mortar. The trowels being adjusted, as desirable, the box is taken by the handles and moved forward alongside the surface to be plastered or finished, the trowels forming the rear of the machine. The forward wheels in turning, operating through the medium of the cog-wheels, push in the plunger and thus force out the mortar, which is evenly spread by the trowels.

With this machine work can be done in one-third of the time required by the ordinary method.

Having thus described our invention, what we claim as new, and desire to secure by Letters Patent, is—

1. The trowel G, attached to the adjustable and pivoted levers $l$ $l$, as and for the purpose specified.

2. In combination with the trowel G, the trowel $i$, the trough-shaped mouth C, box A, and plunger D, as and for the purpose specified.

3. The box A, the plunger D, the mouth C, the rack-bar E, the cog-wheels $d$ and $e$ with the pinion $a$, the trowels G and $i$, the lever-arms $l$ $l$ combined with wheels F F and H H and handles I I, substantially as described.

GUSTAVUS STEVENS.
JAMES H. WATSON.

Witnesses to both signatures:
W. C. STEVENS,
W. M. LOCKE.